G. R. ROGERS.
ANIMAL TRAP.
APPLICATION FILED JAN. 4, 1915.
1,194,239.
Patented Aug. 8, 1916.
2 SHEETS—SHEET 1.
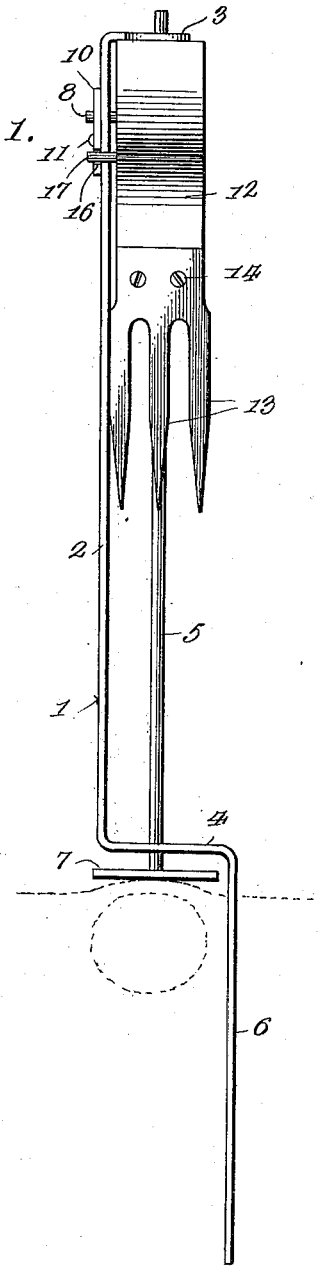
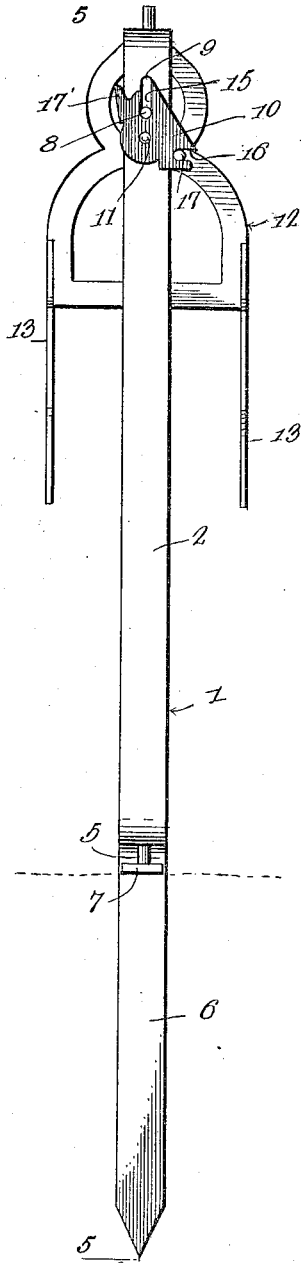
Inventor
George R. Rogers.
Witnesses
Guy M. Spring
W. Eballs Jr.
By Richard B. Owen.
Attorney

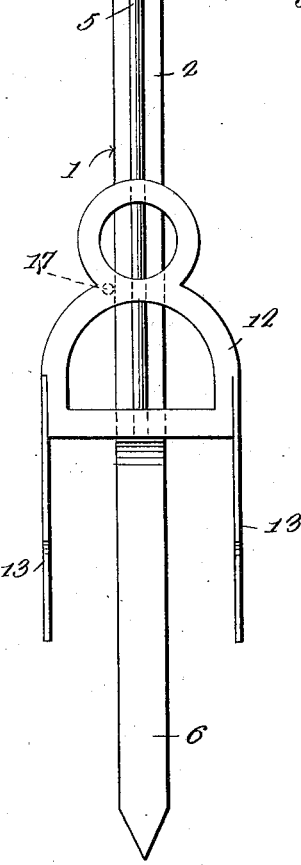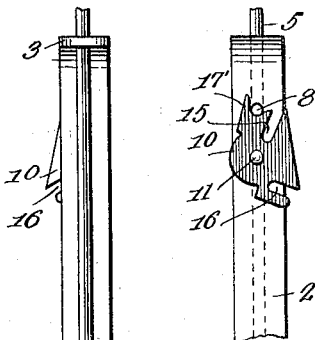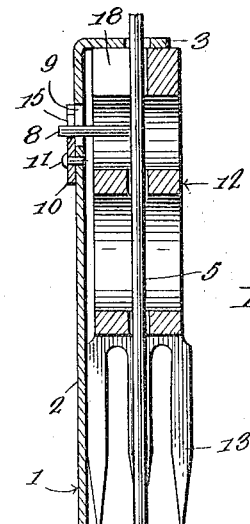

UNITED STATES PATENT OFFICE.

GEORGE R. ROGERS, OF LADOGA, INDIANA, ASSIGNOR OF ONE-HALF TO FLOYD B. YOUNGBLOOD, OF MONTGOMERY COUNTY, INDIANA.

ANIMAL-TRAP.

1,194,239.   Specification of Letters Patent.   Patented Aug. 8, 1916.

Application filed January 4, 1915. Serial No. 461.

*To all whom it may concern:*

Be it known that I, GEORGE R. ROGERS, citizen of the United States, residing at Ladoga, in the county of Montgomery and State of Indiana, have invented certain new and useful Improvements in Animal-Traps, of which the following is a specification.

My invention relates to animal traps and has special reference to an improved device designed for the purpose of entrapping moles and like insectivorous or earth boring mammals.

The object of the invention is to so associate novel trip mechanism with a vertically movable weighted spear as to cause the latter, when released, to fall by gravity, and with sufficient force to maim and hold the animal caught until subsequently released.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which—

Figure 1 is a side elevation of the trap, set; Fig. 2 is a face view; Fig. 3 is a view similar to Fig. 2, looking at the opposite face, the trap having been sprung or released; Fig. 4 is a fragmentary view in elevation illustrating the detail formation of the trip plate; and Fig. 5 is a section on the lines 5—5 of Fig. 2.

Referring now to the drawings by numerals, 1 designates as an entirety the support means for the working parts of traps, the said support comprising an upright body 2 bent or extended at an angle as indicated at 3 to form with a similarly bent portion 4 a suitable guide or bearing for the trip rod 5, the latter being movable vertically relatively to the support in a manner to be hereinafter fully described. The support means 1 is preferably constructed from a single elongated strip of metal bent as shown to form the bearings 3 and 4 and to form an earth penetrating stem or blade 6, the said stem or blade being adapted for insertion in the ground to effectually maintain the support 1 in an upright position or in a position to insure perfect operation of the movable coacting trap parts.

Secured to the trip rod 5, and disposed for engagement with the ground as indicated in Fig. 1, is a suitable trip plate 7. An extension 8 is secured to the said rod 5 at a point adjacent the opposite terminal thereof from that to which the trip plate 7 is secured, the said extension 8 being adapted to fit a slot or opening 9 in the body 2 of the support. The engagement between the extension and the slot terminals will serve as a means limiting movement of the trip rod 5. A specially constructed trip plate or trigger designated 10 is pivoted as at 11 to the upright 2 of the said support at a point adjacent the lower terminal of the said slot 9, the said trigger 10 being oscillatable or movable on its pivot to release or reset the trap. Said trigger 10 when the trap is set, is so positioned relatively to the support as to engage and uphold a sliding carrier or weight member 12, the latter being movable vertically relatively to the support, the trip rod 5 acting as a guide therefor during such movement. Preferably, the carrier 12 is of a formation shown in Figs. 2 and 3, such formation providing a horizontally flat base from the respective terminals of which extend downwardly sharpened spear points 13, the spear points or blades being affixed to the carrier as indicated at 14 in Fig. 1. When set, that is, when the carrier 12 is supported in its uppermost position, the extension 8 of the trip rod is adapted to fit a vertical slot 15 formed in the trigger 10, the said slot 15, of a necessity being in registration with the slot 9 of the support. The engagement between the trigger 10 and the pin 8 will effectually hold the former against oscillation about its pivot 11. The trigger 10 is further provided with a horizontal slot 16 so positioned relatively to the carrier 12, when elevated, as to receive a pin 17 projecting laterally therefrom, such engagement holding the carrier elevated or raised. The trigger 10 at a point adjacent the slot 15 is extended as indicated at 17, the extension being engageable with the rod extension 8 for the obvious purpose of holding the trigger 10 in such relation to the support as to provide for an automatic resetting of the trap after it has once been sprung. It will be noted that that portion of the trigger forming the bottom edge of the slot 16 is somewhat shortened relatively to that portion forming the top edge of the said slot in order that the pin 17 may automatically reposition itself within the slot through movement of the carrier 12 into its final uppermost position. The upper portion of the carrier or weight member 12 is cut away as indicated at 18 in order that the extension 8 may in no way interfere with the movement of the carrier in the operation of the trap.

In use, and assuming that the carrier is in the position indicated in Fig. 3 or that the trap is to be set, the said carrier is moved by hand upwardly out of engagement with the horizontally extended portion 4 of the support until in engagement with the extension 3, in which event the trigger 10 will have acted automatically to hold the carrier in such raised position. As the carrier 12 is moved upwardly relatively to the support 1 it is evident that the pin 17 will, as before suggested, engage the extended upper edge of the slot 16, cause the trigger to be oscillated or moved on its pivot 11 sufficiently to aline the slot 15 with the support slot 9, in which event the weight of the trip rod 5 and the trip plate 7 will cause the former to drop, and the extension 8 to fit the said slot 15 thus automatically locking the trigger 10 against movement. The edge of the trigger 10 adjacent the extension 17′ is so formed as to cause the pin or extension 8 to rise thereupon and automatically adjust itself in the desired manner both in resetting and unseating the carrier. The carrier having been thus automatically locked in its uppermost position, and the support 1 having been positioned as shown in Fig. 1 with the blade 6 penetrating the earth and the trip plate 7 resting on the top surface of the ground, the said trap is then ready to be sprung. As indicated in Fig. 1, the disrupted soil caused by the boring or the burrowing of the mole will exert an upward pressure on the trip plate 7 sufficiently to elevate the extension 8 to release the trigger 10, the latter when released by the extension 8 automatically moving from the position shown in Fig. 2 to the position shown in Fig. 4, the weight of the carrier acting as the operating force, thereby causing the said carrier by its weight, and by gravity to fall or drop with such force as to cause the spear points or blades 13 to penetrate the soil and maim and hold the mole until subsequently removed. When sprung, the spear points or blades straddle that portion of the support designated 4.

From the foregoing, taken in connection with the accompanying drawings it will be noted that the resetting of the trap is effected automatically by simply raising the carrier until in engagement with the extension 3; that gravity alone acts as the operating force subsequent to the release of the trigger 10; and that by the novel formation of the trigger 10, means have been provided whereby the trap parts will automatically adjust themselves in such a manner as to provide for a resetting of the trap without danger of unintended or premature operation.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In an animal trap, an upright support, a weighted spear mounted for movement by gravity from an elevated position upon said support to a position in penetrating engagement with the ground, a pivoted trigger mounted on said support in the path of movement of said spear to be engaged thereby in elevating the spear for automatically and releasably fastening said spear in its elevated position, a trip mechanism, and a means on said trip mechanism to engage with and lock said trigger against movement.

2. In an animal trap, an upright support, a weighted spear mounted for movement by gravity from an elevated position upon said support to a position in penetrating engagement with the ground, a slotted trigger pivoted at one side of said support, means on said spear to engage with said trigger in elevating the spear, said means operating automatically to seat itself in the slot of said trigger to thus releasably fasten the spear in its elevated position, and a trip mechanism operable to disengage said means and said trigger to release said gear, substantially as described.

3. In an animal trap, an upright body, a weighted spear movable vertically relatively to the body, a trigger oscillatable at a point adjacent the top of said body, trip mechanism movable relatively to the body, means forming a part of said trip mechanism and engaging the trigger to normally hold the latter against oscillation, means on the carrier and engaging the trigger to hold the former in its uppermost position, means to limit movement of the trigger subsequent to movement of the trip mechansm out of engagement therewith, said trigger when moved adapted to automatically release the spear, and means to support the body in an upright position.

In testimony whereof I affix my signature in presence of two witnesses.

GEORGE R. ROGERS.

Witnesses:
E. LESLIE WARNER,
WALTER T. HARRIS.

Copies of this patent may be obtained for five cents each, by addressing the "Commissioner of Patents, Washington, D. C."